(12) United States Patent
Head et al.

(10) Patent No.: US 8,306,865 B2
(45) Date of Patent: Nov. 6, 2012

(54) PRICING REMOTE INFORMATION TECHNOLOGY INFRASTRUCTURE MONITORING SERVICES

(75) Inventors: Michael R. Head, Tarrytown, NY (US); Anca Sailer, Scarsdale, NY (US); Hidayatullah H Shaikh, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 12/620,926

(22) Filed: Nov. 18, 2009

(65) Prior Publication Data
US 2011/0119143 A1 May 19, 2011

(51) Int. Cl.
*G06Q 30/00* (2006.01)
(52) U.S. Cl. ..................................... 705/26.1
(58) Field of Classification Search .................. 705/26.1
See application file for complete search history.

(56) References Cited

U.S. PATENT DOCUMENTS
7,065,496 B2 * 6/2006 Subbloie et al. ............. 705/7.35

OTHER PUBLICATIONS

Servicing networks from afar; Indian outsourcers expand IT offerings but hurdles remain; Rasul Bailay and Peter Wonacott; Wall Street Journal. (Europe). Brussels: May 18, 2006. p. 28; http://proquest.umi.com/pqdweb?did=1038349991&sid=5&Fmt=3&clientld=19649&RQT=309&VName=PQD.*
Petrie et al. The Myth of Open Web Services, The Rise of the Service Parks, Stanford University and Christoph Bussler, Merced Systems, Published by the IEEE Computer Society, 2008, pp. 80-82.
Service-oriented architecture—Wikipedia, the free encyclopedia, http://en.wikipedia.org/wiki/Service-oriented_architecture.

* cited by examiner

*Primary Examiner* — Mila Airapetian
(74) *Attorney, Agent, or Firm* — Ryan, Mason & Lewis, LLP

(57) ABSTRACT

A provider of remote information technology infrastructure monitoring services obtains, from a customer, via a remote managed infrastructure services web site, a choice of at least one remote managed information technology infrastructure monitoring service for an information technology infrastructure of the customer, and corresponding data necessary to provide the at least one service. Based on the choice and the necessary data, the provider determines at least two different options for providing the at least one monitoring service, including at least price and service coverage. The provider obtains from the customer, via the remote managed infrastructure services web site, a selection of one of the at least two options. While providing the at least one monitoring service for the information technology infrastructure of the customer in accordance with the selection and the necessary data, during a predetermined period of time, monitoring data is collected and analyzed to develop a revised price for future provision of the at least one monitoring service by the provider to the customer.

25 Claims, 5 Drawing Sheets

PRICING REMOTE INFORMATION TECHNOLOGY INFRASTRUCTURE MONITORING SERVICES

FIELD OF THE INVENTION

The present invention relates to the electrical and electronic arts, and, more particularly, to information technology (IT) and the like.

BACKGROUND OF THE INVENTION

Service-oriented architecture (SOA) provides a set of principles used during systems development and integration. Functionality is provided as interoperable services; for example, software modules provided as a service can be used by several entities, even if their respective client systems are substantially different. An implementation of SOA is denoted a service oriented architecture implementation. Instead of defining an application program interface (API), SOA defines the interface in terms of protocols and functionality. The entry point to such an SOA implementation is referred to as an endpoint.

In remote managed services, service providers use their own fixed network operations center to remotely monitor and manage clients' information technology (IT) infrastructure elements such as networks, system hardware and software, operating systems and applications.

The current pricing methodology for remote managed services consists of a manual evaluation of the equipment and labor involved in the services provided for a customer's site, based on the number of systems to be monitored and the operating system (OS) type of the systems. This limited information is insufficient to accurately forecast the number of incidents a particular endpoint may generate, as well as the storage volume required to record the monitoring data of those end-points. Thus, the price currently evaluated is typically not commensurate with the cost of providing the service.

SUMMARY OF THE INVENTION

Principles of the present invention provide techniques for pricing remote information technology infrastructure monitoring services. In one aspect, an exemplary method (which can be computer implemented) includes the step of obtaining, by a provider of remote information technology infrastructure monitoring services, from a customer, via a remote managed infrastructure services web site, a choice of at least one remote managed information technology infrastructure monitoring service for an information technology infrastructure of the customer, and corresponding data necessary to provide the at least one remote managed information technology infrastructure monitoring service. An additional step includes, based on the choice and the necessary data, determining, by the provider, at least two different options for providing the at least one remote managed information technology infrastructure monitoring service, the at least two options comprising at least price and service coverage. A further step includes obtaining, by the provider, from the customer, via the remote managed infrastructure services web site, a selection of one of the at least two options. A still further step includes, while providing the at least one remote managed information technology infrastructure monitoring service for the information technology infrastructure of the customer in accordance with the selection and the necessary data, during a predetermined period of time, collecting and analyzing monitoring data to develop a revised price for future provision of the at least one remote managed information technology infrastructure monitoring service by the provider to the customer.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:

Facilitates the automation of threshold management for specific customers' behavior Makes the price commensurate with the cost of providing the service.

These and other features, aspects and advantages of the present invention will become apparent from the following detailed description of illustrative embodiments thereof, which is to be read in connection with the accompanying drawings.

DETAILED DESCRIPTION OF PREFERRED EMBODIMENTS

Aspects of the invention relate to determining a base price for monitoring. This basic monitoring service has a different dynamic than management services, i.e., it is a continuous service on top of which additional limited in time services can be provided. A customer typically decides on a monitoring service for a long period of time, as opposed to buying a short-lived service such as problem determination, vulnerability scanning, and the like, which rely on the monitoring data.

Figure 1:
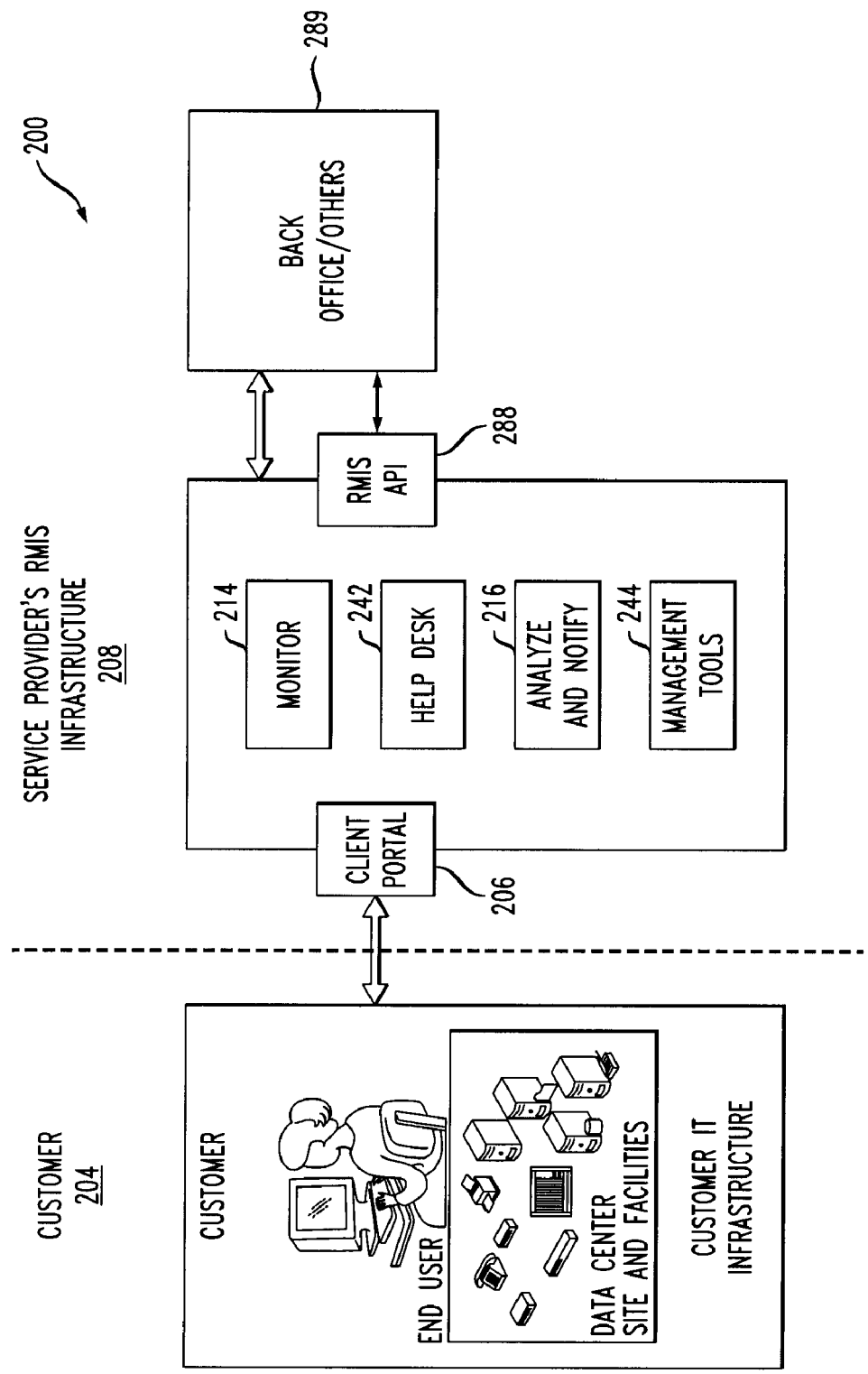
FIG. 1 shows an exemplary system block diagram.

FIG. 1 shows a non-limiting exemplary system block diagram 200 of an environment I which one or more embodiments of the invention may be implemented. A customer 204 typically has one or more end users as well as an IT infrastructure which may include, for example, one or more data center sites with IT resources including managed servers, bridges, routers, printers, voice over internet protocol (VoIP) components, switches, storage, endpoint agents including ITM (IBM Tivoli® Monitoring software—registered mark of International Business Machines Corp., Armonk, N.Y., USA) and/or ESA (Electronic Service Agent), and the like. These items are not separately numbered in FIG. 1, to avoid clutter. Note that IBM Tivoli® Monitoring software is a non-limiting example of system monitoring software to manage operating systems, databases and servers in distributed and host environments. Furthermore, another exemplary customer IT infrastructure is discussed with respect to FIG. 4 below.

Customer 204 interacts with the infrastructure 208 of an entity providing remote monitoring services; for example, using client portal 206. Infrastructure 208 can include any one or more of monitoring module 214, help desk module 242, analysis and notification module 216, and management tools module 244. Access to infrastructure 208 may be afforded to back office personnel of the entity providing remote monitoring services, and/or others, as depicted at 289. Such access may be provided by RMIS (remote managed infrastructure services) application program interface (API) 288 of infrastructure 208, or otherwise.

Figure 3:
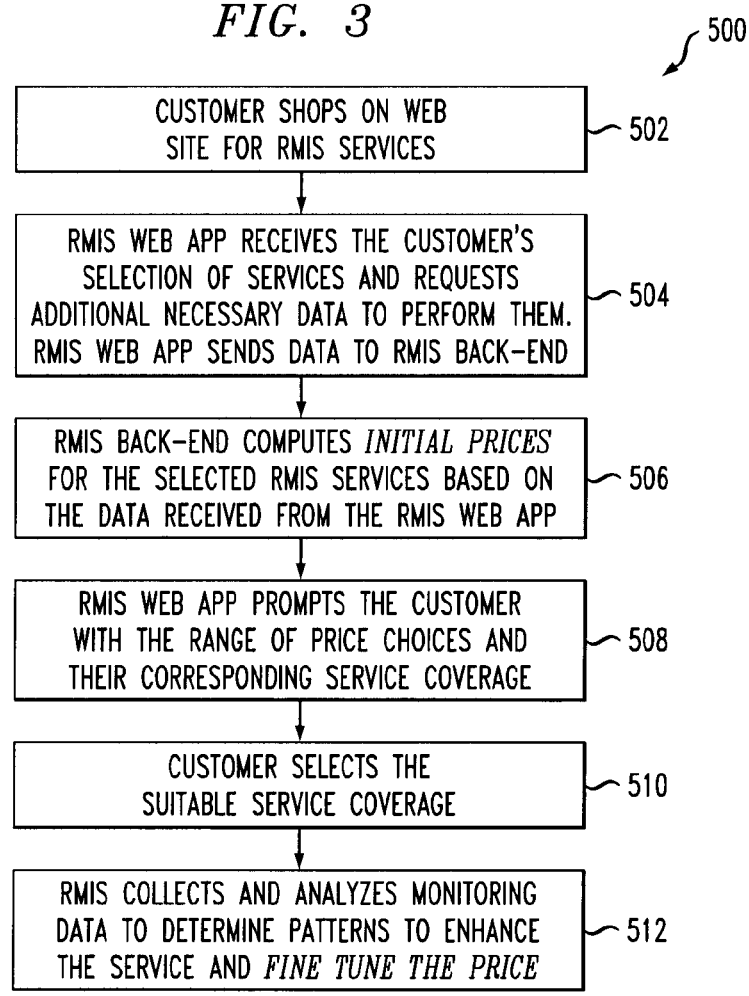
FIG. 3 shows a flow chart of an exemplary RMIS pricing schema, according to an aspect of the invention.

One or more embodiments of the invention provide a method to enhance the price computation of remote managed monitoring services for a subscribed customer. For example, first, a limited (limited in time and/or limited in functionality) service version is offered at an initial price to cover the upfront service cost; and then the price is updated based on (i) the evaluation of the actual service usage and (ii) monitoring behavior patterns identified by analyzing the monitoring data. With reference to flow chart 500 of FIG. 3, in one or more embodiments, one method step 502 includes presenting to the customer (for example, using an RMIS specific web application such as client portal 206) the choice of different RMIS services, as well as any required forms, which request the necessary data to perform each service. Step 504 includes receiving from the customer on the RMIS web application the customer's choice of services and all the required data from the forms. Step 506 includes using the data on the RMIS back-end (for example, management tools 244 or analysis module 216) to compute the initial prices for the RMIS services. Step 508 includes presenting to the customer on the RMIS web application (e.g., portal 206) the different price choices (including free offerings) with their corresponding service coverage (limited in the case of the free offerings). Step 510 includes receiving from the customer, on the RMIS web application, the customer's choice of price. Step 512 includes collecting and analyzing the monitoring data gathered with module 214, to determine the actual service usage; as well as monitoring behavior patterns; and fine tuning the price accordingly. Such analysis may be carried out, for example, with analysis module 216.

By introducing automation when pricing the RMIS customers, one or more embodiments of the invention allow the RMIS services' price to more realistically reflect the potential costs involved in delivering the services, since the pricing process is systematized, and thus fewer steps or requirements are overlooked. Moreover, by analyzing the monitoring data to detect patterns, additional services can be provided (such as, for example, managing the metrics' thresholds in an easier way by suggesting optimized limits for normal operation values). The monitoring data patterns can also be used to better forecast the pricing while the service is provided, as well as to generate service classes reflecting different price ranges, so as to assist those sales personnel still using the manual process.

Figure 4:
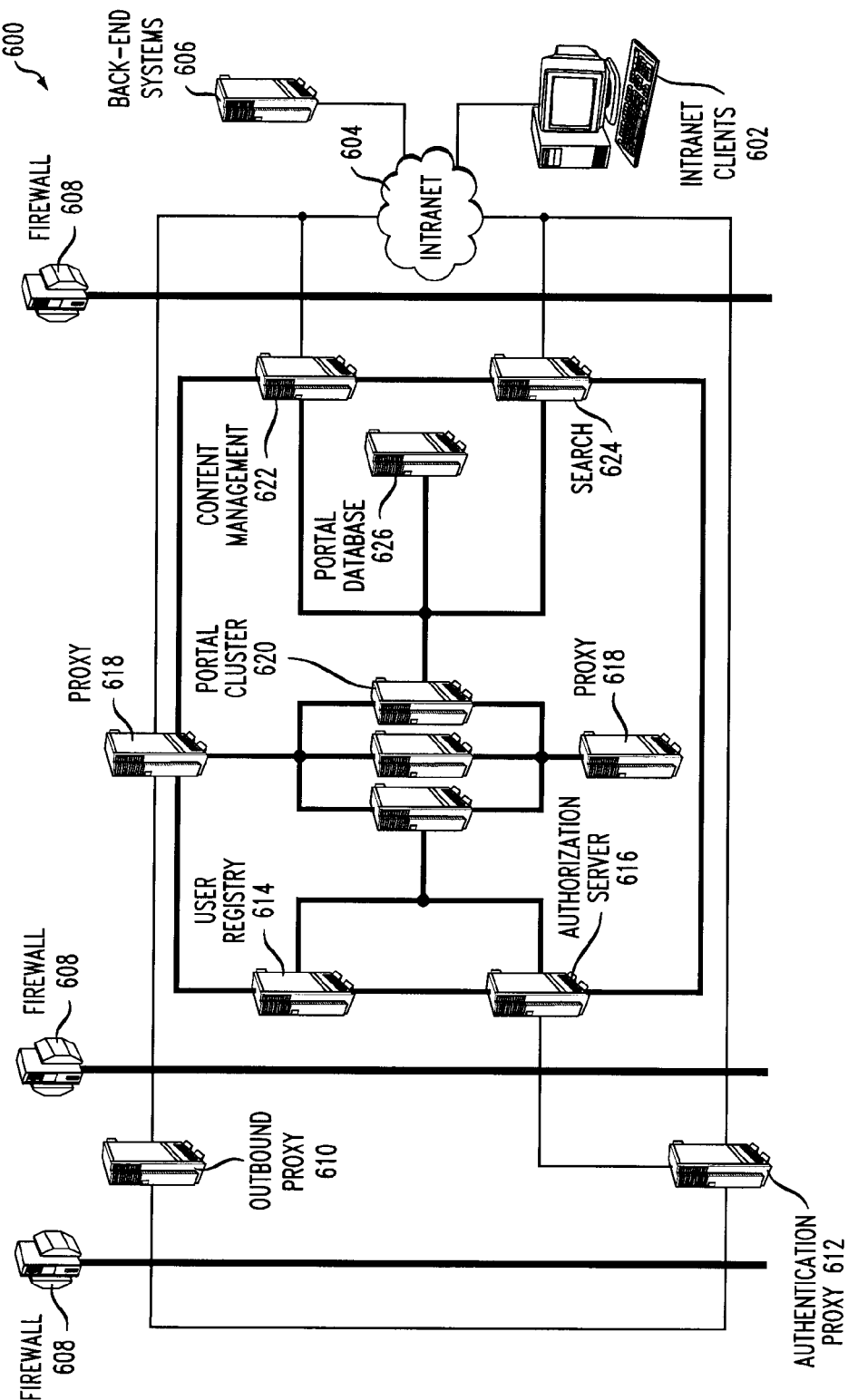
FIG. 4 shows an exemplary customer environment.

In step 502, the customer 204 navigates on an RMIS specific web application 206 at the web site of the service provider (who maintains infrastructure 208), using a browser on a local machine. The customer 204 owns an environment which may include, for example, multiple network elements, servers, desktops, operating systems, middleware and applications. A non-limiting exemplary customer information technology infrastructure 600 is shown in FIG. 4. In particular, customer environment 600 is a web environment with intranet clients 602, intranet 604, backend systems 606, firewalls 608, outbound proxy 610, authentication proxy 612, user registry 614, authorization server 616, proxies 618, portal cluster 620, control management 622, database with search functionality 624, portal 626, and the like. Those skilled in the art will appreciate, however, that the customer environment can be replaced with any other IT infrastructure without altering the pricing method.

Once the customer has decided to buy RMIS services for environment 600 and selected same, the RMIS application prompts the customer to fill out various data forms to enable the services, such as, but not limited to, account registration, locations, business hours, discovered environment for validation, selection of systems to be monitored, credentials, prerequisites installation, and the like. For details on the on-boarding process, reference is made to FIG. 6, which depicts an exemplary embodiment of a highly automated remote managed services on-boarding process.

Note that "SNAPPIMON" software (mark of Network Solutions, an IBM company (International Business Machines Corporation, Armonk, N.Y., USA)) is a non-limiting example of monitoring suite software; "CODESK" software (mark of Network Solutions, an IBM company (International Business Machines Corporation, Armonk, N.Y., USA)) is a non-limiting example of scalable, flexible, service desk software; "OS" stands for "operating system"; DB2® software (registered mark of International Business Machines Corporation, Armonk, N.Y., USA) is a non-limiting example of database software; and Network Operations Center—Inside (NOC Inside or NOCI) software is a non-limiting example of a packaged, automated, information technology (IT) infrastructure management service for managing end to end IT infrastructure (mark of Network Solutions, an IBM company (International Business Machines Corporation, Armonk, N.Y., USA)).

The SMB (Small to Medium Business) customer 6002 shops for RMIS on an RMIS-specific web application on web server 6004, using a browser on local machine 6006. The RMIS web application downloads and launches, via an RMIS web client, a network discovery tool to detect the customer's environment 6008. The SMB customer 6002 validates, on the RMIS web application, the resources just discovered, in accordance with their environment.

The SMB customer 6002 selects, on the RMIS web application, the resources to be managed from among the resources just validated. The RMIS web application prompts the customer 6002 to provide additional credentials required to enable monitoring. The RMIS back-end 6010 checks for monitoring pre-requisites for all the selected systems, applications, middleware and databases. The RMIS web application sends the inventory and configuration data back to the RMIS back-end 6010. The RMIS back-end 6010 computes the service price and prompts the customer 6002 to "Buy" via the RMIS web application. Upon selection of "Buy", the RMIS web client initiates the firewall configuration for site-to-site virtual private network (VPN) and network address translation (NAT-ing) of endpoints with minimal or no customer intervention. The RMIS web client installs and configures the necessary software to enable monitoring and management at customer premises 6008, with or without the customer's intervention. The RMIS back-end 6010 begins the monitoring and management, sends an invoice and collects payment.

Figure 6:
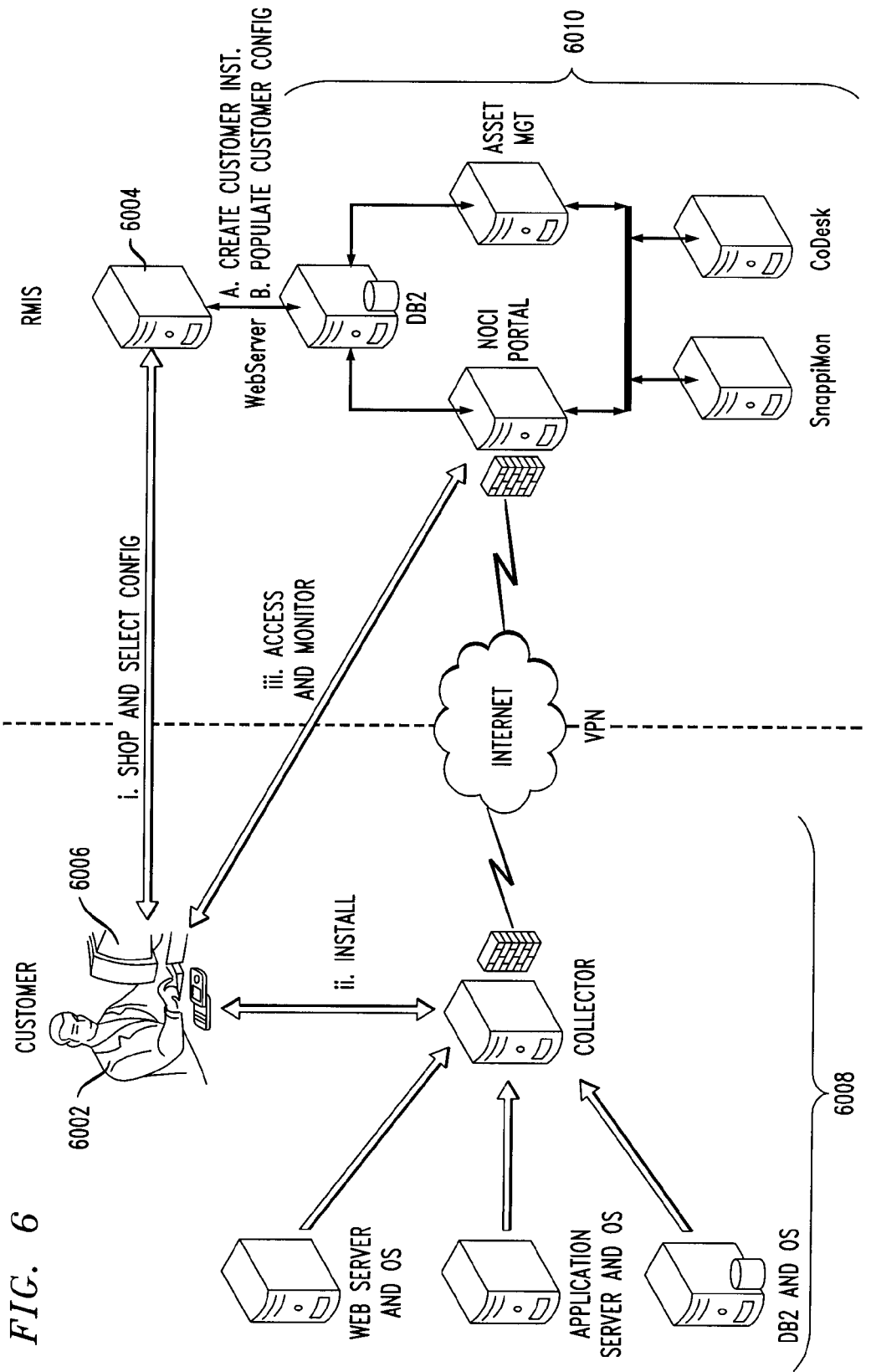
FIG. 6 depicts an exemplary embodiment of a highly automated remote managed services on-boarding process.

Recall the description above, with respect to FIG. 6, wherein the SMB customer 6002 selects, on the RMIS web application, the resources to be managed from the resources previously validated, and recall also that the RMIS web application prompts the customer to provide additional credentials required to enable monitoring. This aspect intersects with step 504, where the RMIS web application prompts the customer for services selection and for all additional data required to enable the selected services. This data is sent to the RMIS back-end 6010 as described above for an initial price computation.

In step 506, the RMIS back-end evaluates the data received and computes an initial price for the selected services. This price is mainly based on upfront cost to provide those services (e.g., for metrics' storage, pre-requisites installation, configuration, maintenance, and the like).

In step 508, the Customer is offered, on the RMIS web application, different possible service choices; for example, limited services for free or full service with charge. As a non-limiting example, three choices are given below:

Free trial version of the RMIS monitoring service for the first month (or any other limited time) of service. The customer has full access to the main monitoring functionalities. The configuration of the monitoring tool is unsupported; thus, the customers have basically to choose the metrics to be monitored and the service level objectives thresholds themselves.

Free trial version of the RMIS monitoring service with limited service. In this case, the customer can monitor for free a fixed selection of metrics decided by the RMIS provider. The customer has the possibility to set up the service level objectives thresholds.

Full service with charge. This option includes the services of an RMIS specialist for the monitoring tool configuration. Thus, the choice of the metrics to be monitored as well as the service level objectives thresholds are to be selected following the specialist's guidance.

It will be appreciated that there are other potential service offerings, such as partial pricing of selected service functionalities.

In step 510, the customer makes his or her choice on the RMIS web application, from among the various offering presented in step 508. At this point, the selected services can start to be provided to the customer.

In step 512, the RMIS back-end analyzes the monitoring data collected during the first month of service (or any meaningful duration of time) to update and fine tune the service price, propose additional services such as automatic or specialist-guided metric threshold management, and so on.

Figure 5:
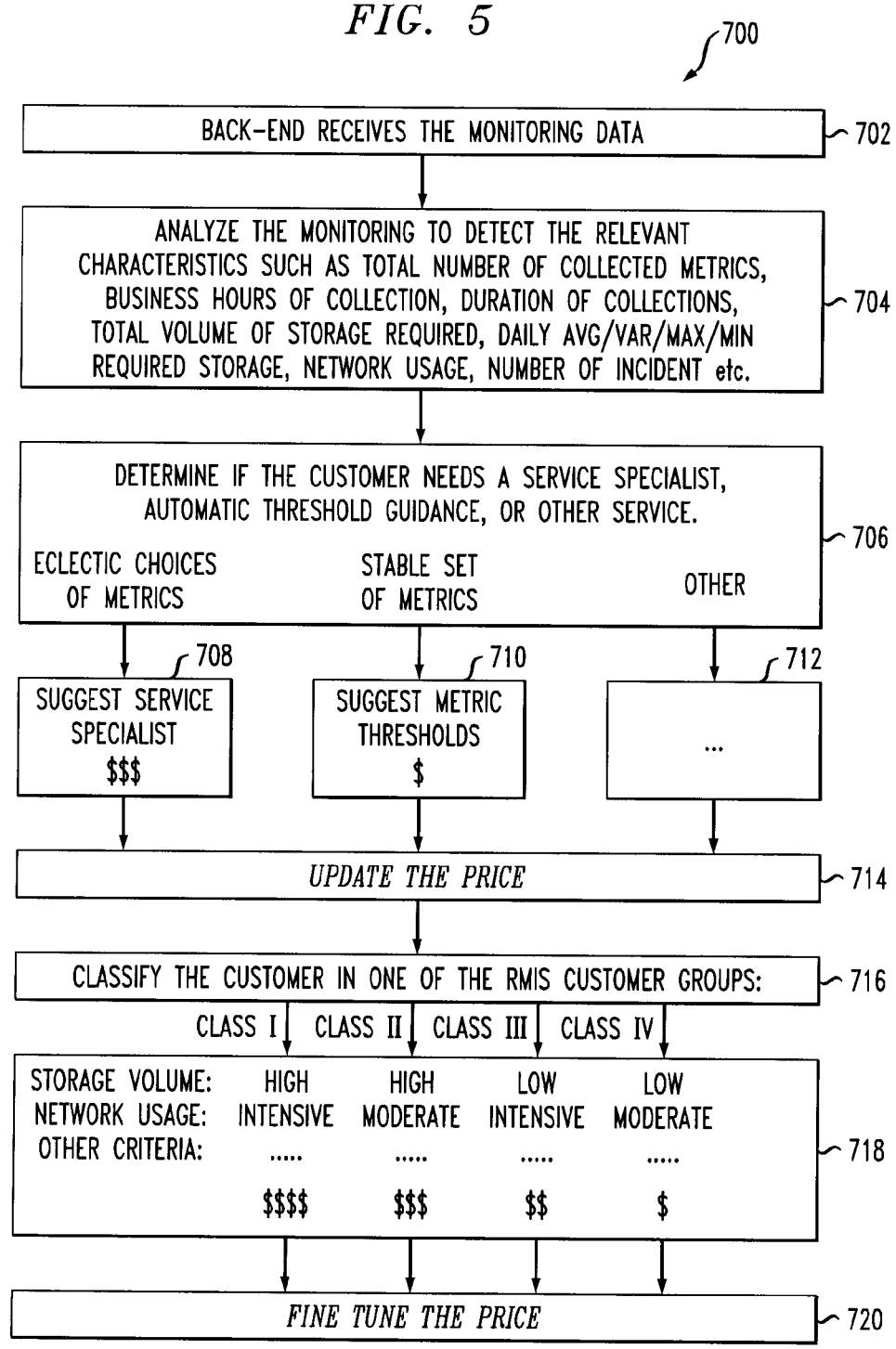
FIG. 5 shows a flow chart of exemplary price fine tuning during provision of a monitoring service, according to another aspect of the invention.

FIG. 5 depicts one non-limiting exemplary manner of carrying out step 512. As seen in flow chart 700 of FIG. 7, in step 702, the RMIS back-end receives the monitoring data (using, e.g., monitor 214). In step 704, the data is analyzed (for example, with analysis module 216) to detect the relevant characteristics of the customer's metric collections, such as, for example, the total number of collected metrics, the business hours of collection, the duration of collections, the total volume of storage required, the daily required storage (average, maximum, minimum, variation), network usage, number of incidents, and so on.

Based on the findings from step 704, in step 706, detect the type of additional services potentially needed by the customer. The customer classification can be done, for example, automatically. The additional services may be performed, for example, either by a human or automatically depending on the service type as explained below. Thus, if it turns out the customer keeps changing the monitoring metrics, it may seem that the customer would benefit from an RMIS specialist to help decide what the relevant metrics for that particular customer environment are, as at step 708. If, on the contrary, the customer seemed to have found the right set of metrics to be monitored, and hence the set of metrics had been stable for the trial time, the RMIS could suggest the assistance of an automated thresholds-computation service tailored to the customer's historical data, as at 710. The specialist services are typically going to be more expensive compared to the automated thresholds computation tool, and an additional charge may be incurred, depending on the initial service choice made by the customer. Optionally, other services can be considered here for offer to the customer, as at 712.

Step 714 reflects the price update which occurs if the additional services proposed at steps 706-712 are added by the customer to the initial service. This can be done, for example, via any type of notification systems: email, phone call, letter, and the like, which can refer to an update included in a web page on 206. The pricing is typically done by a back office dedicated department 289, not by the management tools. Department 289 may use, for example, APIs 288 from the management tools for collecting the necessary data.

In step 716, the Customer monitoring behavior is classified based on the analysis performed at step 704. In an exemplary embodiment of the invention, consider four classes, as shown at 718, based on the storage volume used by the customer's monitoring data and the network usage. Thus, in the first class (Class I), the customer monitors a high number of metrics, hence requiring high storage volume. Also, the monitoring takes place frequently, implying intensive network utilization. In the second class (Class II), the customer monitors a high number of metrics but the monitoring takes place less frequently or at different times for different metrics, leading to moderate network utilization. In the third class (Class III), the customer frequently monitors a few metrics, while in the fourth class (Class IV) the monitoring takes place for a few metrics less frequently or at different times for different metrics. Each class reflects a different price charge, as indicated by the different numbers of dollar signs ($-$$$$). More specific classes can, of course, be included based on relevant price differentiators identified in the analysis of step 704. To conclude, in step 720, the different prices from the partial updates are summed for the final price tuning. This is done, for example, by a separate entity 289 outside the management scope. The pricing and billing entity 289 leverages the management tools API 288, but it is not part of it, in this example. Note that block 289 is generally representative of one or more entities.

Given the discussion thus far, it will be appreciated that, in general terms, an exemplary method, according to an aspect of the invention, includes the step of obtaining, by a provider of remote information technology infrastructure monitoring services, from a customer 204, via a remote managed infrastructure services web site 206, a choice of at least one remote managed information technology infrastructure monitoring service for an information technology infrastructure 600 of the customer, and corresponding data necessary to provide the service. This step can be carried out, for example, as described with respect to steps 502 and 504. An additional step includes, based on the choice and the necessary data, determining, by the provider, at least two different options for providing the service, as per step 506. The at least two options include at least price and service coverage. A further step includes obtaining, by the provider, from the customer, via the remote managed infrastructure services web site, a selection of one of the options. This step can be carried out, for example, as described with respect to steps 508 and 510. In a further step, while providing the service in accordance with the selection and the necessary data, during a predetermined period of time, collect and analyze monitoring data to develop a revised price for future provision of the service by the provider to the customer, as in step 512.

In at least some cases, the at least two options include at least one limited option (limited in at least one of time and functionality). In some cases, the limited option has a price commensurate with covering an up front service cost for providing the service for the predetermined period of time; by way of example and not limitation, the price might include metric storage cost, pre-requisite installation cost, configuration cost, and/or maintenance cost.

In some cases, there is at least a third option; as described above, one option might be a free trial version without support; another might be a free trial version with support; and a third might be a full service version.

In one or more instances, step 512 and/or step 704 include detecting patterns in the monitoring data; and a further step (e.g., steps 706-712) includes suggestions to the customer based on the patterns. For example, the provider might suggest to the customer an optimized limit for a normal operating value of at least one metric monitored by the provider during the provision of the service.

The monitoring data gathered by module 214 may include, for example, one or more of detection of number of metrics, business hours of the collecting, duration of the collecting, total required storage volume, storage per unit time, and network usage, as in step 704. In some instances, an additional step (such as 706-712) includes, based on the detection, determining, by the provider, at least one additional service potentially needed by the customer.

As at 706 and 708, where the customer changes the metrics frequently during the predetermined period of time, the at least one additional service may include provision of a service specialist to update the metrics.

As at 706 and 710, where the metrics remain stable during the predetermined period of time, the at least one additional service may include an automated threshold computation service tailored based on the monitoring data.

The cost associated with the at least one additional service can be included in the revised price.

The customer may be classified based on the analyzing of the monitoring data, as at 716-718, and the revised price can be based, at least in part, on the classifying, as at 720. As shown at 718, the classifying can include classifying the customer into one of four classes, such as:

a first class wherein the customer monitors a large number of first metrics with frequent monitoring a second class wherein the customer monitors a large number of second metrics with limited monitoring a third class wherein the customer monitors a limited number of third metrics with frequent monitoring a fourth class wherein the customer monitors a limited number of fourth metrics with limited monitoring In the general case, the first through fourth metrics may be similar or different.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 2:
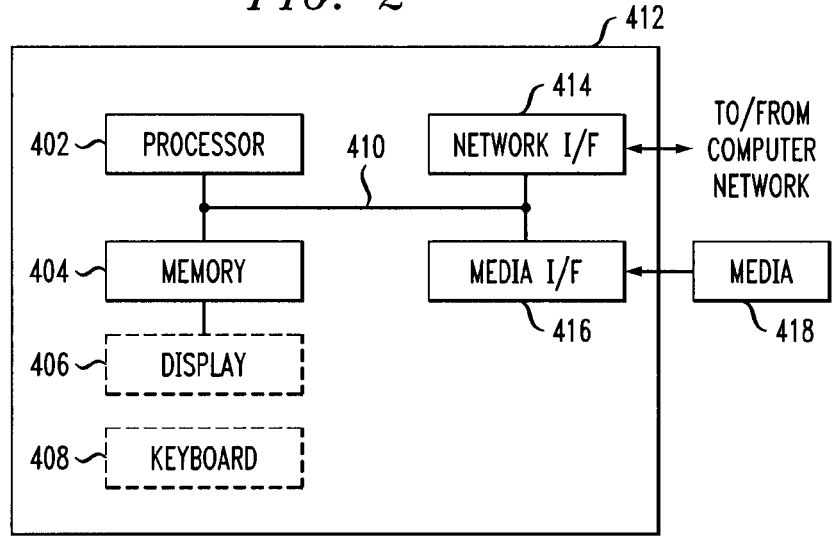
FIG. 2 depicts a computer system that may be useful in implementing one or more aspects and/or elements of the invention.

One or more embodiments can make use of software running on a general purpose computer or workstation. With reference to FIG. 2, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 2) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagram of FIG. 1; by way of example and not limitation, a client portal module, a monitoring module, an analysis module, and a management module. In some instances, the modules can include the client portal module and a back end module; the latter may include, for example, analysis, notification, monitoring, and/or management functionality. The method steps can then be carried out using the distinct software modules and/or sub-modules of the system, as described above, executing on one or more hardware processors 402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising the steps of:
   obtaining, by a provider of remote information technology infrastructure monitoring services, from a customer, via a remote managed infrastructure services web site, a choice of at least one remote managed information technology infrastructure monitoring service for an information technology infrastructure of said customer, and corresponding data necessary to provide said at least one remote managed information technology infrastructure monitoring service;
   based on said choice and said necessary data, determining, by said provider, at least two different options for providing said at least one remote managed information technology infrastructure monitoring service, said at least two options comprising at least price and service coverage;
   obtaining, by said provider, from said customer, via said remote managed infrastructure services web site, a selection of one of said at least two options;
   while providing said at least one remote managed information technology infrastructure monitoring service for said information technology infrastructure of said customer in accordance with said selection and said necessary data, during a predetermined period of time, collecting and analyzing monitoring data to develop a revised price for future provision of said at least one remote managed information technology infrastructure monitoring service by said provider to said customer.

2. The method of claim 1, wherein at least one of said at least two options comprises a limited option, wherein said limited option is limited in at least one of time and functionality.

3. The method of claim 2, wherein said limited option has a price commensurate with covering an up front service cost for providing said at least one remote managed information technology infrastructure monitoring service for said predetermined period of time.

4. The method of claim 3, wherein said price comprises at least metric storage cost, pre-requisite installation cost, configuration cost, and maintenance cost.

5. The method of claim 1, wherein said at least two options comprise at least a third option, and wherein:
   a first of said at least two options comprises a free trial version without support;
   a second of said at least two options comprises said free trial version with support; and
   said third option comprises a full service version.

6. The method of claim 1, further comprising:
   detecting patterns in said monitoring data; and
   based on said patterns, suggesting, by said provider to said customer, an optimized limit for a normal operating value of at least one metric monitored by said provider during said provision of said at least one remote managed information technology infrastructure monitoring service.

7. The method of claim 1, wherein said analysis of said monitoring data comprises at least detection of number of metrics, business hours of said collecting, duration of said collecting, total required storage volume, storage per unit time, and network usage.

8. The method of claim 7, further comprising, based on said detection, determining, by said provider, at least one additional service potentially needed by said customer.

9. The method of claim 8, wherein said customer changes said metrics frequently during said predetermined period of time, and wherein said at least one additional service comprises provision of a service specialist to update said metrics.

10. The method of claim 8, wherein said metrics remain stable during said predetermined period of time, and wherein said at least one additional service comprises an automated threshold computation service tailored based on said monitoring data.

11. The method of claim 8, further comprising including a cost associated with said at least one additional service in said revised price.

12. The method of claim 1, further comprising classifying said customer based on said analyzing of said monitoring data, wherein said revised price is based, at least in part, on said classifying.

13. The method of claim 12, wherein said classifying comprises classifying said customer into one of four classes, said classes comprising:

a first class wherein said customer monitors a large number of first metrics with frequent monitoring;

a second class wherein said customer monitors a large number of second metrics with limited monitoring;

a third class wherein said customer monitors a limited number of third metrics with frequent monitoring; and a fourth class wherein said customer monitors a limited number of fourth metrics with limited monitoring.

14. The method of claim 1, further comprising providing a system, wherein the system comprises distinct software modules, each of the distinct software modules being embodied on a computer-readable storage medium, and wherein the distinct software modules comprise a client portal module and a back end module;

wherein:

said obtaining of said choice is carried out by said client portal module executing on at least one hardware processor;

said determining is carried out by said back end module executing on said at least one hardware processor;

said obtaining of said selection is carried out by said client portal module executing on said at least one hardware processor; and said collecting and analyzing are carried out by said back end module executing on said at least one hardware processor.

15. A computer program product comprising a computer readable storage medium having computer readable program code embodied therewith, said computer readable program code comprising:

computer readable program code configured to obtain, by a provider of remote information technology infrastructure monitoring services, from a customer, via a remote managed infrastructure services web site, a choice of at least one remote managed information technology infrastructure monitoring service for an information technology infrastructure of said customer, and corresponding data necessary to provide said at least one remote managed information technology infrastructure monitoring service;

computer readable program code configured to, based on said choice and said necessary data, determine, by said provider, at least two different options for providing said at least one remote managed information technology infrastructure monitoring service, said at least two options comprising at least price and service coverage;

computer readable program code configured to obtain, by said provider, from said customer, via said remote managed infrastructure services web site, a selection of one of said at least two options;

computer readable program code configured to, while providing said at least one remote managed information technology infrastructure monitoring service for said information technology infrastructure of said customer in accordance with said selection and said necessary data, during a predetermined period of time, collect and analyze monitoring data to develop a revised price for future provision of said at least one remote managed information technology infrastructure monitoring service by said provider to said customer.

16. The computer program product of claim 15, wherein at least one of said at least two options comprises a limited option, wherein said limited option is limited in at least one of time and functionality.

17. The computer program product of claim 16, wherein said limited option has a price commensurate with covering an up front service cost for providing said at least one remote managed information technology infrastructure monitoring service for said predetermined period of time.

18. The computer program product of claim 17, wherein said price comprises at least metric storage cost, pre-requisite installation cost, configuration cost, and maintenance cost.

19. The computer program product of claim 15, wherein said at least two options comprise at least a third option, and wherein:

a first of said at least two options comprises a free trial version without support;

a second of said at least two options comprises said free trial version with support; and said third option comprises a full service version.

20. An apparatus comprising:

a memory; and at least one processor, coupled to said memory, and operative to:

obtain, by a provider of remote information technology infrastructure monitoring services, from a customer, via a remote managed infrastructure services web site, a choice of at least one remote managed information technology infrastructure monitoring service for an information technology infrastructure of said customer, and corresponding data necessary to provide said at least one remote managed information technology infrastructure monitoring service;

based on said choice and said necessary data, determine, by said provider, at least two different options for providing said at least one remote managed information technology infrastructure monitoring service, said at least two options comprising at least price and service coverage;

obtain, by said provider, from said customer, via said remote managed infrastructure services web site, a selection of one of said at least two options;

while providing said at least one remote managed information technology infrastructure monitoring service for said information technology infrastructure of said customer in accordance with said selection and said necessary data, during a predetermined period of time, collect and analyze monitoring data to develop a revised price for future provision of said at least one remote managed information technology infrastructure monitoring service by said provider to said customer.

21. The apparatus of claim 20, wherein at least one of said at least two options comprises a limited option, wherein said limited option is limited in at least one of time and functionality.

22. The apparatus of claim 21, wherein said limited option has a price commensurate with covering an up front service cost for providing said at least one remote managed information technology infrastructure monitoring service for said predetermined period of time.

23. The apparatus of claim 22, wherein said price comprises at least metric storage cost, pre-requisite installation cost, configuration cost, and maintenance cost.

24. The apparatus of claim 20, further comprising a plurality of distinct software modules, each of the distinct software modules being embodied on a computer-readable storage medium, and wherein the distinct software modules comprise a client portal module and a back end module;

wherein:

said at least one processor is operative to obtain said choice by executing said client portal module;

said at least one processor is operative to determine by executing said back end module;

said at least one processor is operative to obtain said selection by executing said client portal module; and said at least one processor is operative to collect and analyze by executing said back end module on said at least one processor.

25. An apparatus comprising:

means for obtaining, by a provider of remote information technology infrastructure monitoring services, from a customer, via a remote managed infrastructure services web site, a choice of at least one remote managed information technology infrastructure monitoring service for an information technology infrastructure of said customer, and corresponding data necessary to provide said at least one remote managed information technology infrastructure monitoring service;

means for, based on said choice and said necessary data, determining, by said provider, at least two different options for providing said at least one remote managed information technology infrastructure monitoring service, said at least two options comprising at least price and service coverage;

means for obtaining, by said provider, from said customer, via said remote managed infrastructure services web site, a selection of one of said at least two options;

means for, while providing said at least one remote managed information technology infrastructure monitoring service for said information technology infrastructure of said customer in accordance with said selection and said necessary data, during a predetermined period of time, collecting and analyzing monitoring data to develop a revised price for future provision of said at least one remote managed information technology infrastructure monitoring service by said provider to said customer.

* * * * *